US010196586B1

United States Patent
Meza Almendra et al.

(10) Patent No.: US 10,196,586 B1
(45) Date of Patent: Feb. 5, 2019

(54) FEED INGREDIENT

(71) Applicant: Golden Omega S.A., Las Condes, Santiago (CL)

(72) Inventors: Julio César Meza Almendra, Arica (CL); José Luis Lopez Castillo, Arica (CL); Pablo Napolitano Feito, Arica (CL); Gustavo Adolfo Dorlhiac Silva, Arica (CL); Luis Tomás Pincheira Varas, Arica (CL); Alejandro Markovits Rojas, Arica (CL)

(73) Assignee: GOLDEN OMEGA S.A., Santiago, Las Condes (CL)

( * ) Notice: Subject to any disclaimer, the term of this patent is extended or adjusted under 35 U.S.C. 154(b) by 14 days.

(21) Appl. No.: 15/896,133

(22) Filed: Feb. 14, 2018

(51) Int. Cl.
| | |
|---|---|
| *C11B 3/12* | (2006.01) |
| *C11C 1/02* | (2006.01) |
| *C11C 1/10* | (2006.01) |
| *C11C 3/00* | (2006.01) |
| *B01D 3/10* | (2006.01) |
| *A23K 50/80* | (2016.01) |
| *A23K 10/22* | (2016.01) |
| *A23K 20/158* | (2016.01) |

(52) U.S. Cl.
CPC ............... *C11B 3/12* (2013.01); *B01D 3/10* (2013.01); *C11C 1/02* (2013.01); *C11C 1/10* (2013.01); *C11C 3/003* (2013.01); *A23K 10/22* (2016.05); *A23K 20/158* (2016.05); *A23K 50/80* (2016.05)

(58) Field of Classification Search
CPC .... C07J 9/00; C11B 3/12; C11C 3/003; C11C 1/10; C11C 1/02; B01D 3/10; A23K 10/22; A23K 20/158; A23K 50/80
See application file for complete search history.

(56) References Cited

U.S. PATENT DOCUMENTS

| | | | | | |
|---|---|---|---|---|---|
| 3,734,951 | A | * | 5/1973 | Suter et al. ............. | C07C 67/08 560/193 |
| 6,136,368 | A | | 10/2000 | Fitie | |
| 7,678,930 | B2 | * | 3/2010 | Sondbo .................... | A23D 9/00 554/12 |
| 7,718,698 | B2 | * | 5/2010 | Breivik .................... | A23D 9/00 514/558 |

FOREIGN PATENT DOCUMENTS

| | | |
|---|---|---|
| GB | 489623 A | 7/1938 |
| JP | 09084527 A * | 3/1997 |

OTHER PUBLICATIONS

Wikipedia I, Wikipedia, Docosahexaenoic acid, pp. 1-8, recovered from https://en.wikipedia.org/ wiki/Docosahexaenoic_acid on Apr. 18, 2018. (Year: 2018).*
Chemspider, ChennSpider, Eicosapentaenoic acid, p. 1, recovered from http://www.chemspider.com/Chemical-Structure.4941649.html on Apr. 18, 2018. (Year: 2018).*
Wikipedia II, Wikipedia, Cholesterol, pp. 1-24, recovered from https://en.wikipedia.org/wiki/Cholesterol on Apr. 18, 2018 (Year: 2018).*

* cited by examiner

*Primary Examiner* — Paul A Zucker
(74) *Attorney, Agent, or Firm* — Blank Rome LLP

(57) ABSTRACT

Disclosed is a process for producing a composition involving: (a) distilling fish oil in a vacuum distillation column to obtain a first residue and first distillate, and (b) distilling the first distillate in a vacuum distillation column to obtain a second distillate and a second residue that includes a composition containing cholesterol, eicosapentaenoic acid, and docosahexaenoic acid. Also disclosed is a process for producing a composition involving: (a) distilling fish oil in a vacuum distillation column to obtain a first residue and first distillate, (b) distilling the first distillate in a vacuum distillation column to obtain a second distillate and second residue containing cholesterol, (c) esterifying the second residue to obtain a mixture containing cholesterol esters, and (d) distilling the mixture in a vacuum distillation column to obtain a third distillate and a third residue that includes a composition containing cholesterol esters of eicosapentaenoic acid and docosahexaenoic acid.

23 Claims, No Drawings

FEED INGREDIENT

FIELD OF THE INVENTION

The present invention is related to processes for obtaining from fish oil: compositions comprising cholesterol, eicosapentaenoic acid and docosahexaenoic acid and compositions comprising cholesteryl esters of eicosapentaenoic acid and cholesteryl esters of docosahexaenoic acid, and the use of the compositions in animal feed, especially in shrimp and prawn feed.

BACKGROUND

Formulated feed for shrimp and prawn mass culture and feed ingredients.

Formulated feed for shrimp and prawn mass culture is a very complex mixture of numerous ingredients from different sources specifically addressed to supply the nutrients and energy shrimp and prawn need for best growth. (FAO: www.fao.org/fishery). A complete feed is a formulated pellet that provides all required nutrients in the proper proportions necessary for rapid weight gain, high feed efficiency and necessary for shrimp and prawn health and quality.

Cholesterol, and the fatty acids eicosapentaenoic acid (EPA), docosahexaenoic acid (DHA), linoleic acid (LA), and alpha-linolenic acid (ALA) are among the several essential nutrients which cannot be synthesized by shrimp or prawn, so a dietary source is essential.

Cholesteryl esters of normal fatty acids are also useful to this effect as well. Shin-ichi Teshima et al. have shown that the absorptions of free cholesterol and cholesterol esterified with normal fatty acids in a prawn were very similar (Bulletin of the Japanese Society of Scientific Fisheries 49(6) 963-966 (1983)).

Typically, fish oils incorporated into the formulated pellet at 2 to 3 percent, provide the essential fatty acids EPA and DHA, meanwhile vegetable oils like soybean oil and linseed oil provide the essential fatty acids LA and ALA. Dietary requirements of EPA and DHA for shrimp and prawn range from 0.5 to 1.0 percent in the feed. The total lipid content of the formulated pellet should be in the range of 6 to 9%.

Fish oil also contains, on the average, about 1% of total (free and esterified) cholesterol but this does not suffice alone to satisfy the cholesterol requirements of shrimp or prawn, because as mentioned above, fish oil which is included typically at 2 to 3% in the feed would contribute at most only 0.02-0.03% of cholesterol in the diet instead of 0.5 to 1.0%, which is the range of the dietary requirement of cholesterol for shrimp and prawn.

GB 489623 discloses a process for obtaining cholesterol from marine animal oils by subjecting the oil to fractionation through multiple sequential vacuum distillations at different temperature and pressure, wherein one or more of the distillate fractions comprise cholesterol, both free and esterified. Such fractions comprising cholesterol, if desired, may be further purified by methods such as saponification followed by extraction of non-saponifiable matter with a water immiscible solvent, concentration and crystallization.

There are several disadvantages of the process disclosed by GB 489623. At present, fish oil is a valuable commodity due to its content of eicosapentaenoic (EPA) and docosahexaenoic (DHA) acid. Multiple distillations of fish oil increase the trans fatty acid content of the oil, and promote polymerization of unsaturated fatty acid, which in turn decrease the content of EPA and DHA. Multiple distillations also render the fish oil unsuitable for human or animal consumption.

On the other hand, present day fish oils contain a great variety of toxic and/or harmful anthropogenic contaminants like polychlorinated biphenyls (PCB), dichlorodiphenyl-trichloroethane (DDT) and its metabolites, dibenzo-dioxins (PCDDs), and dibenzo-furans (PCDFs), poly-aromatic hydrocarbons (PAH), pesticides and their degradation products, also known as persistent organic pollutants or POP's, which are resistant to environmental degradation and thus bio-accumulate. Therefore, the distillate fractions comprising cholesterol of the process of GB 489623 will comprise as well one or more of such contaminants and the content of such contaminants in the distillate fractions will be even higher than in the fish oil. This fact, though evident, can be found in the prior art.

U.S. Pat. No. 7,678,930 discloses a process for obtaining a cholesterol-reduced fish oil by vacuum stripping the oil. The distillate is therefore a cholesterol containing composition containing some free EPA and DHA as well. All the fish oil contaminants are concentrated in the distillate or cholesterol containing composition of the process of U.S. Pat. No. 7,678,930.

This is evident from the prior art because U.S. Pat. No. 7,718,698 discloses a process for decreasing the amount of environmental pollutants in fish oil, also by vacuum stripping the oil. U.S. Pat. No. 7,678,930 and U.S. Pat. No. 7,718,698 disclose similar processes. Therefore, under conditions of vacuum distillation where environmental pollutants are removed, cholesterol is removed as well and vice versa. The distillate of the process of U.S. Pat. No. 7,678,930 has a level of toxic and/or harmful anthropogenic contaminants higher than the fish oil and its cholesterol content is no greater than 10%, therefore it is unsuitable as a source of cholesterol in formulated shrimp and prawn feed because it would itself satisfy the total lipid requirements in the feed, leaving no room to further addition of the other two essential fatty acids LA and ALA containing lipids, and would also lead to a feed having contaminants above the maximum permissible limits.

An objective of the present invention is to obtain from fish oil comprising over 2% of free fatty acids, a composition comprising at least 20% of cholesterol and at least 15% of polyunsaturated fatty acids comprising eicosapentaenoic acid (EPA) and docosahexaenoic acid (DHA), or obtaining a composition comprising at least 50% of cholesteryl esters, the cholesteryl esters comprising at least 20% of cholesteryl esters of eicosapentaenoic acid and docosahexaenoic acid, wherein such compositions may be utilized as feed ingredient in animal feed, such as formulated shrimp and prawn feed, so as to provide the required amount of cholesterol and the essential polyunsaturated fatty acids eicosapentaenoic acid or docosahexaenoic without the need of including fish oil or any additional source of cholesterol in the formulation. In at least one embodiment, the disclosed residual or processed fish oil is a high-quality fish oil suitable for animal or human consumption or for the elaboration of EPA and DHA concentrates.

SUMMARY OF THE INVENTION

In one aspect, the disclosed technology relates to a process for producing a composition comprising cholesterol, eicosapentaenoic acid and docosahexaenoic acid, comprising the steps of: (a) distilling a fish oil in a vacuum distillation column to obtain a first residue and a first distillate, and (b) distilling the first distillate in a vacuum distillation column to obtain a second distillate and a second residue, wherein the second residue comprises the composition comprising cholesterol, eicosapentaenoic acid, and docosahexaenoic. In one embodiment, in step (a) the fish oil is distilled in an admixture with an auxiliary fluid. In another embodiment, the weight ratio of the auxiliary fluid to the fish oil in the admixture is about 1:100 to 10:100. In another embodiment, the vacuum distillation column is a short-path distillation column. In another embodiment, the fish oil is fed into the vacuum distillation column in step (a) at a rate of 1 to 150 kg/h per $m^2$ of evaporator area. In another embodiment, the admixture is fed into the vacuum distillation column at a rate of 1 to 150 kg/h per $m^2$ of evaporator area. In another embodiment, step (a) is conducted at an evaporation temperature of 150 to 300° C. and a column pressure of 0.0001 to 0.5 mbar. In another embodiment, step (a) is conducted at an evaporation temperature of 180 to 280° C. and a column pressure of 0.001 to 0.1 mbar. In another embodiment, the first distillate is fed to a vacuum distillation column in step (b) at a rate of 10 to 350 kg/h per $m^2$ of evaporator area. In another embodiment, step (b) is conducted at an evaporation temperature of 100 to 250° C. and a column pressure of 0.0001 to 0.5 mbar. In another embodiment, the second residue in step (b) comprises a composition comprising at least 20% of cholesterol and at least 15% of polyunsaturated fatty acids, wherein the polyunsaturated fatty acids comprise eicosapentaenoic acid and docosahexaenoic acid. In another embodiment, the second residue in step (b) is a composition having a lower content of anthropogenic contaminants than the fish oil.

In another aspect, the disclosed technology relates to a process for producing a composition comprising cholesteryl esters of eicosapentaenoic acid and docosahexaenoic acid, comprising the steps of: (a) distilling fish oil in a vacuum distillation column to obtain a first residue and a first distillate, (b) distilling the first distillate in a vacuum distillation column to obtain a second distillate and a second residue comprising cholesterol, (c) esterifying the second residue to obtain a mixture comprising cholesteryl esters, and (d) distilling the mixture comprising cholesteryl esters in a vacuum distillation column to obtain a third distillate and a third residue, wherein the third residue comprises the composition comprising cholesteryl esters of eicosapentaenoic acid and cholesteryl esters of docosahexaenoic acid. In one embodiment, in step (a) the fish oil is distilled in an admixture with an auxiliary fluid. In another embodiment, the vacuum distillation column is a short-path distillation column.

In another embodiment, the fish oil is fed into the vacuum distillation column in step (a) at a rate of 1 to 150 kg/h per $m^2$ of evaporator area. In another embodiment, the weight ratio of the auxiliary fluid to the fish oil in the admixture is about 1:100 to 10:100. In another embodiment, step (a) is conducted at an evaporation temperature of 150 to 300° C. and a column pressure of 0.0001 to 0.5 mbar. In another embodiment, the first distillate is fed into the vacuum distillation column in step (b) at a rate of 10 to 350 kg/h per $m^2$ of evaporator area. In another embodiment, the admixture is fed to the vacuum distillation column in step (a) at a rate of 1 to 150 kg/h per $m^2$ of evaporator area. In another embodiment, step (b) is conducted at an evaporation temperature of 100 to 250° C. and a column pressure of 0.0001 to 0.5 mbar. In another embodiment, the second residue in step (b) is fed to a closed vessel at a pressure of less than 250 mbar and heated at a temperature of 50 to 200° C. for a period of time between 1 to 72 hours to obtain an esterified mixture. In another embodiment, the esterified mixture is fed to the vacuum distillation column at a rate of 50 to 300 kg/h per $m^2$ of evaporator area. In another embodiment, step (d) is conducted at an evaporation temperature of 150 to 260° C. and a column pressure of 0.0001 mbar to 0.5 mbar. In another embodiment, the third residue of step (d) comprises a composition comprising at least 50% of cholesteryl esters, the cholesteryl esters comprising at least 20% cholesteryl esters of polyunsaturated fatty acids, wherein the cholesteryl esters of polyunsaturated fatty acids comprise cholesteryl esters of eicosapentaenoic acid and cholesteryl esters of docosahexaenoic acid. In another embodiment, the third residue of step (d) is a composition having lower content of anthropogenic contaminant than the fish oil.

The objective of obtaining from fish oil comprising over 2% of free fatty acids, a composition comprising at least 20% cholesterol and at least 15% of polyunsaturated fatty acids comprising eicosapentaenoic acid (EPA) and docosahexaenoic acid, (DHA) wherein such composition may be utilized as feed ingredient in animal feed, such as formulated shrimp and prawn feed, that provides the required amount of cholesterol and the essential polyunsaturated fatty acids eicosapentaenoic acid or docosahexaenoic without the need of including fish oil or any additional source of cholesterol in the formulation, and simultaneously producing a residual or processed fish oil of high-quality suitable for animal or human consumption or for the elaboration of EPA and DHA concentrates, is achieved by process 1.

Process 1.
 a) distilling fish oil in a vacuum distillation column to obtain a first residue and a first distillate, and
 b) distilling the first distillate in a vacuum distillation column to obtain a second distillate and a second residue, the second residue comprising cholesterol, eicosapentaenoic acid and docosahexaenoic acid.

The objective of obtaining from fish oil comprising over 2% of free fatty acids, a composition comprising at least 50% of cholesteryl esters, the cholesteryl esters comprising at least 20% of cholesteryl esters of eicosapentaenoic acid and docosahexaenoic acid, wherein such compositions may be utilized as feed ingredient in animal feed, such as formulated shrimp and prawn feed, that provides the required amount of cholesterol and the essential polyunsaturated fatty acids eicosapentaenoic acid or docosahexaenoic without the need of including fish oil or any additional source of cholesterol in the formulation, and simultaneously producing a residual or processed fish oil of high quality, suitable for animal or human consumption or for the elaboration of EPA and DHA concentrates, is achieved by process 2.

Process 2.
 a) distilling fish oil to obtain a first residue and a first distillate,
 b) distilling the first distillate in a vacuum distillation column to obtain a second distillate and a second residue comprising cholesterol,
 c) esterifying the second residue to obtain a mixture comprising cholesterol esters, and,
 d) distilling the mixture comprising cholesteryl esters in a vacuum distillation column to obtain a third distillate and a third residue, the third residue comprising cholesteryl esters of eicosapentaenoic acid

DETAILED DESCRIPTION OF THE INVENTION

Fish Oil

As used herein, the term "fish oil" refers to oils obtained from wild and farmed fish, crustaceans and other marine animals. Such oils are obtained from the whole body of the fish or from its by-products such as liver, head etc. Examples of such oils comprise anchovy oil, sardine oil, salmon oil, jack mackerel oil, menhaden oil, tuna oil, hill oil, squid oil, pollock oil, herring oil, capelin oil, cod liver oil and squid oil. Fish oils may be derived from a single species or mixtures of fish oils.

Fish oil also refers to any fish oil from fish oil/meal factories, including degummed or bleached fish oil, having an acid number of at least 4. Such oils, in addition to triglycerides, their main component, typically comprise between 2 to 10% of free fatty acids and about 2% or less of non-saponifiable matter composed primarily of cholesterol, glyceryl ethers, fatty alcohols squalene and saturated hydrocarbons. (Young, F.V.K. "The Chemical & Physical Properties of Crude Fish Oils for Refiners & Hydrogenators" Fish Oil Bulletin No. 18, 1986). The average cholesterol content of fish oil is about 1%.

In addition fish oils contain a great variety of toxic and/or harmful anthropogenic contaminants like polychlorinated biphenyls (PCB), DDT and its metabolites, dibenzo-dioxins (PCDDs), and dibenzo-furans (PCDFs), poly-aromatic hydrocarbons (PAH), pesticides and their degradation products, also known as persistent organic pollutants or POP's, which are resistant to environmental degradation and thus bio-accumulate.

It is a surprising feature of the present invention that the cholesterol containing compositions obtained according to the processes described herein lead to lower concentration of anthropogenic contaminants than the fish oil they are obtained from or even to compositions with anthropogenic contaminant level below the limit of quantification (LOQ).

In the present invention a vacuum distillation column may be a short-path distillation column having an internal condenser at the proximity of the heated surface or evaporator. The short-path distillation column is also known as a molecular distillation column when the distance between the evaporator and the condenser is comparable to the mean free path of the distillate molecules under the operating conditions. Therefore, in the present invention vacuum distillation column may be a short-path distillation column, a molecular distillation column, or an equivalent thereof.

Detailed Description of Process 1 a) Distilling the Fish Oil

The fish oil is fed into a vacuum distillation column, generally at a rate in the range of 1 to 150 kg/h per m$^2$ of evaporator area, preferably at a rate in the range of 10 to 100 kg/h per m$^2$ of evaporator area.

In an embodiment, the evaporation temperature is between 150° C. and 300° C., preferably between 180° C. and 280° C. In an embodiment, the column pressure is between 0.0001 mbar and 0.5 mbar, preferably between 0.001 and 0.1 mbar. In an embodiment, the evaporation temperature is between 150° C. and 300° C., preferably between 180° C. and 280° C., and the column pressure is between 0.0001 mbar and 0.5 mbar, preferably between 0.001 and 0.1 mbar.

The distillation process results in the separation of a first distillate comprising cholesterol, other non-saponifiable matter of the fish oil, free fatty acids and anthropogenic contaminants, and a first residue comprising fish oil with decreased content of cholesterol, non-saponifiable matter and anthropogenic contaminants. The first distillate condenses at the internal condenser. The first distillate and the first residue leave the column separately and are collected at the column exit. The first residue is a high quality fish oil suitable for human or animal consumption or for the elaboration of EPA and DHA concentrates.

In case the free fatty acid content of the fish oil is less than about 6%, the first distillate rich in cholesterol, at the temperature of the condenser which is preferably lower than 60° C., may form a very viscous slow flowing film at the condenser or may even solidify, thus clogging the condenser. This is due to the high melting point of the cholesterol (136° C.). There are two solutions provided to this problem in the state of art, both resorting to some auxiliary fluid (AF). In one solution, the AF is contacted with the fish oil to form an admixture and the admixture is distilled at the conditions of temperature and pressure as described above. The second solution consists in feeding the AF directly over the condenser surface.

An auxiliary fluid (AF) when utilized in an admixture with fish oil, includes any fluid or mixture of fluids which distills at the vacuum distilling conditions disclosed above, and is also in a liquid state at the condenser temperature and dissolves or is miscible with cholesterol, thus reducing its concentration in the condensed film, therefore forming a free downward flowing fluid mixture at the condenser, and preventing clogging or fouling of the condenser. Any fluid or fluid mixture fulfilling the above requirements can be used as an auxiliary fluid, though preferred auxiliary fluids for the present invention include ethyl esters of unsaturated fatty acids or mixtures of ethyl esters of fatty acids mostly composed of unsaturated fatty acids, because such auxiliary fluids allow the use of lower condenser temperature which in turn improves the vacuum system performance and reduces the re-evaporation rate of the condensates, thereby improving the overall removal yield of the desired distillate.

If the AF is utilized in an admixture with the fish oil, the proportion of auxiliary fluid relative to the fish oil in the admixture is about 1 to 10%, preferably from about 2 to 8%. The admixture, in auxiliary fluid free basis, is fed into the vacuum distillation column, at the rate described above and distilling conditions are the same as described above without auxiliary fluid, but the first distillate additionally comprises the auxiliary fluid as well.

b) Distilling the First Distillate.

The first distillate is fed into a vacuum distillation column at a rate from 10 to 350 kg/h per m$^2$ of evaporating surface, preferably from 50 to 200 kg/h per m$^2$.

In an embodiment, the evaporation temperature is between 100° C. and 250° C., preferably between 140° C. and 220° C. In an embodiment, the column pressure is between 0.0001 mbar and 0.5 mbar, preferably between 0.001 and 0.1 mbar. In an embodiment, the evaporation temperature is between 100° C. and 250° C., preferably between 140° C. and 220° C., and the column pressure is between 0.0001 mbar and 0.5 mbar, preferably between 0.001 and 0.1 mbar.

The distillation process of the first distillate results in the production of a second distillate which condenses at the internal condenser, and a second residue comprising cholesterol and free fatty acids.

The second distillate and the second residue leave the vacuum distillation column separately and are collected at the column exit.

The second residue is a composition comprising at least 20% of cholesterol and at least 15% of polyunsaturated fatty acids, wherein the main polyunsaturated fatty acids are eicosapentaenoic acid and docosahexaenoic acid and can be used as a cholesterol-containing ingredient for shrimp and prawn feed having the additional advantage of being an essential fatty acids-containing ingredient as well and surprisingly having a level of anthropogenic contaminants lower than the fish oil.

If desired, the second residue can be re-distilled once or more in a vacuum distillation column at the above conditions to increase the cholesterol content and also improve the color of the composition.

Detailed Description of Process 2 a) Distilling of the Fish Oil

The fish oil is fed into a vacuum distillation column, generally at a rate in the range of 1 to 150 kg/h per $m^2$ of evaporator area, preferably at a rate in the range of 10 to 100 kg/h per $m^2$ of evaporator area.

In an embodiment, the evaporation temperature is between 150° C. and 300° C., preferably between 180° C. and 280° C. In an embodiment, the column pressure is between 0.0001 mbar and 0.5 mbar, preferably between 0.001 and 0.1 mbar. In an embodiment, the evaporation temperature is between 150° C. and 300° C., preferably between 180° C. and 280° C., and the column pressure is between 0.0001 mbar and 0.5 mbar, preferably between 0.001 and 0.1 mbar.

The distillation process results in the separation of a first distillate comprising cholesterol, other non-saponifiable components of the fish oil, free fatty acids and anthropogenic and naturally occurring impurities, and a first residue comprising fish oil with decreased content of cholesterol, non-saponifiable components and anthropogenic contaminants. The first distillate condenses at the internal condenser. The first distillate and the first residue leave the column separately and are collected at the column exit. The first residue is a high quality fish oil suitable for human or animal consumption or for the elaboration of EPA and DHA concentrates.

In case the free fatty acid content of the fish oil is less than about 6%, the first distillate rich in cholesterol, at the temperature of the condenser which is always lower than 60° C., may form a very viscous slow flowing film at the condenser or may even solidify, thus clogging the condenser. This is due to the high melting point of the cholesterol (136° C.). There are two solutions provided to this problem in the state of art, both resorting to some auxiliary fluid (AF). In one solution, the fish oil is admixed with the AF and the admixture is distilled at the conditions of temperature and pressure as described above. The second solution consists in feeding the AF directly over the condenser surface.

An auxiliary fluid (AF) when utilized in an admixture with the fish oil includes any fluid or mixture of fluids which distills at the vacuum distilling conditions disclosed below, and is also in a liquid state at the condenser temperature and dissolves or is miscible with cholesterol, thus reducing its concentration in the condensed film, therefore forming a free downward flowing fluid mixture at the condenser and preventing clogging or fouling of the condenser. Any fluid or fluid mixture fulfilling the above requirements can be used as an auxiliary fluid, though preferred auxiliary fluids for the present invention include ethyl esters of unsaturated fatty acids or mixtures of ethyl esters of fatty acids mostly composed of unsaturated fatty acids, because such auxiliary fluids allow the use of a lower condenser temperature, which in turn reduces the re-evaporation rate of the condensates, thus improving the overall removal yield of the desired distillate.

If the AF as shown above is utilized, the proportion of auxiliary fluid relative to the fish oil is about 1 to 10%, preferably from about 2 to 8%. The admixture, in auxiliary fluid free basis, is fed into the vacuum distillation column at the rate as described above and distilling conditions are the same as described above without auxiliary fluid, but the first distillate additionally comprises the auxiliary fluid as well.

b) Distilling the First Distillate.

The first distillate is fed into a vacuum distillation column at a rate from 10 to 350 kg/h per $m^2$ of evaporating surface, preferably from 50 to 200 kg/h per $m^2$.

In an embodiment, the evaporation temperature is between 100° C. and 250° C., preferably between 140° C. and 220° C. In an embodiment, the column pressure is between 0.0001 mbar and 0.5 mbar, preferably between 0.001 and 0.1 mbar. In an embodiment, the evaporation temperature is between 100° C. and 250° C., preferably between 140° C. and 220° C., and the column pressure is between 0.0001 mbar and 0.5 mbar, preferably between 0.001 and 0.1 mbar.

The distillation process of the first distillate results in the production of a second distillate which condenses at the internal condenser, and a second residue comprising cholesterol and free fatty acids.

The second distillate and the second residue leave the vacuum distillation column separately and are collected at the column exit.

c) Esterifying the Second Residue

The second residue is fed to a closed vessel. In an embodiment, the closed vessel pressure is less than 250 mbar, preferably less than 50 mbar, most preferably less than 5 mbar. In an embodiment, the closed vessel temperature is between 50 and 250° C., preferably between 100 and 180° C., for a period of time required for reacting the cholesterol and the free fatty acids to form an esterified mixture comprising cholesteryl esters. In an embodiment, the closed vessel pressure is less than 250 mbar, preferably less than 50 mbar, most preferably less than 5 mbar and the reactor temperature is between 50 and 250° C., preferably between 100 and 180° C. for a period of time required for reacting the cholesterol and the free fatty acids to form an esterified mixture comprising cholesteryl esters. Usually, a period of time from about 1 to 72 hours of reacting at the above conditions will suffice to complete the esterification reaction and to obtain an esterified mixture If desired, the esterification reaction can be sped up by using a catalyst such as sulfuric acid, p-toluene sulfonic acid, amberlite, lipase, etc. After the esterification reaction, the catalyst is removed by techniques well known to a skilled person, to obtain an esterified mixture free of catalyst.

d) Distilling the Esterified Mixture

The esterified mixture is fed into a vacuum distillation column, generally at a rate from 50 to 300 kg/h per $m^2$ of evaporating surface, preferably from 100 to 250 kg/h per $m^2$. In an embodiment, the evaporation temperature is between 150° C. and 260° C., preferably between 170° C. and 240° C. In an embodiment, the column pressure is between 0.0001 mbar and 0.5 mbar, preferably between 0.001 and 0.05 mbar. In an embodiment, the evaporation temperature is between 150° C. and 260° C., preferably between 170° C. and 240° C., and the column pressure is between 0.0001 mbar and 0.5 mbar, preferably between 0.001 and 0.05 mbar. The distillation process results in a third distillate and a third residue. The third distillate condenses at the internal condenser, and the third residue comprising cholesteryl esters of fatty acids leave the column separately and are collected at the column exit.

The third residue is a composition comprising at least 50% of cholesteryl esters, the cholesteryl esters comprising at least 20% of cholesteryl esters of polyunsaturated fatty acids, mainly cholesteryl ester of eicosapentaenoic acid and cholesteryl ester of docosahexaenoic acid and can be used as cholesterol-containing ingredient for shrimp and prawn feed having the additional advantage of being an essential fatty acids containing ingredient as well and surprisingly having a level of anthropogenic contaminants below the limit of quantification (LOQ).

The first distillate of both processes is a waste product with a high concentration of persistent organic pollutants (POPs), which may be disposed as fuel. Therefore by the processes of the present invention, cholesterol and free fatty acids considered as impurities of the fish oil are turned into added value products and with POPs content well below current regulatory norms are well suited as feed ingredient for shrimp and prawn.

A better understanding of the present invention may be obtained in light of the following examples which are set forth to illustrate, but are not to be construed to limit the present invention.

Example 1

Cholesterol, EPA and DHA Containing Ingredient for Shrimp and Prawn Feed from Sardine Oil.

240 kg of sardine oil was fed to a VK 83 short path distillation column and distilled at the temperature of 253° C. and the pressure of 0.03 mbar. The condenser temperature was set at 50° C. A distillate D1 in the amount of 18.6 kg together with a residual sardine oil, R1 was obtained.

Next, 10 kg of distillate D1 was fed to a VK 83 short path distillation column at the temperature of 170° C. and the pressure of 0.01 mbar. The condenser temperature was set to 40° C. A residue R2 in the amount of 3.3 kg was obtained. Table 1 presents the analytical results for Example 1.

TABLE 1

Analytical results for Example 1

|  | Sardine oil | Distillate D1 | Residue R2 |
|---|---|---|---|
| Free cholesterol, mg/g | 9.3 | 118.6 | 288.4 |
| Total cholesterol, mg/g | 9.6 | 118.9 | 298.5 |
| Cholesteryl ester[1], mg/g | 0.5 | 0.5 | 17.0 |
| Non-saponifiable matter, % | 1.47 | 16.01 | 30.47 |
| Acid number, mg KOH/g | 14.4 | 171.3 | 133.4 |
| Free (EPA + DHA) % | 0.5 | 6.8 | 18.2 |
| Dioxins, Furans and Dioxin like PCBs, TEQ ppt (lower bound) | 1.61 | 16.96 | 0.35 |
| PCB 209, ppb (lower bound) | 17.21 | 218.12 | 4.28 |
| Total PAHs, ppb | 28.15 | 328.63 | 6.50 |
| Pesticides, ppb | 21.0 | 248.5 | <LOQ |
| Inorganic As, ppm | 3.2 | <LOQ | <LOQ |
| Heavy metals, ppm | 0.06 | <LOQ | <LOQ |

[1]As mg of cholesteryl oleate/g of sample; LOQ: Limit of Quantification

As can be observed, a formulated pellet comprising at most 3% of residue R2, a product of process 1, is enough to meet the cholesterol requirement of shrimp and prawn, thereby eliminating the need to use lanolin derived cholesterol, and is also enough to meet the EPA and DHA requirements of said crustaceans without the need to include fish oil in the feed. In addition, given that the total fat or lipid content in the formulated pellet for shrimps and prawns is from 6 to 9%, there remains an ample choice for additional sources of lipids, such as vegetable oils, to satisfy the two-additional essential fatty acid requirement of the crustaceans, the linoleic acid (LA), and alpha-linolenic acid (ALA).

In R1, there was no increase in trans fatty acids and the sum of EPA and DHA was 2% higher than in the sardine oil utilized; and toxic and/or harmful anthropogenic contaminants were below the regulatory limits for POPs in fish oils.

Example 2

Cholesterol, EPA and DHA Containing Ingredient for Shrimp and Prawn Feed from Anchovy Oil.

240 kg of anchovy oil was admixed with 14.4 kg of auxiliary fluid having the composition set forth in Table 2, and the admixture was fed to a VK 83 short path distillation column and distilled at the temperature of 245° C. and the pressure of 0.01 mbar. The condenser temperature was set to 20° C. A distillate D1 in the amount of 25.9 kg together with a residual anchovy oil R1 was obtained.

Next, 22 kg of distillate D1 was fed to a VK 83 short path distillation column at the temperature of 164° C. and the pressure of 0.005 mbar. The condenser temperature was set to 20° C. A residue R2 in the amount of 6.0 kg was obtained. Table 3 presents the analytical results for Example 2.

TABLE 2

Auxiliary fluid composition in Example 2.

| Fatty acid ethyl ester | Composition concentration, % |
|---|---|
| Myristic acid (C14:0) ethyl ester. | 6.6 |
| Palmitic acid (C16:0) ethyl ester | 8.2 |
| Palmitoleic acid (C16:1) ethyl ester | 46.4 |
| Stearic acid (C18:0) ethyl ester | 1.9 |
| Oleic acid (C18:1) ethyl ester | 29.3 |
| Linoleic acid (C18:2) ethyl ester | 4.1 |
| Alpha-linolenic acid (18:3) ethyl ester | 3.5 |

TABLE 3

Analytical results for Example 2

|  | Anchovy oil | Distillate D1 | Residue R2 |
|---|---|---|---|
| Free cholesterol, mg/g | 9.1 | 81.4 | 246.3 |
| Total cholesterol, mg/g | 10.2 | 81.7 | 254.5 |
| Cholesteryl ester[1], mg/g | 1.8 | 0.5 | 13.8 |
| Non-saponifiable matter, % | 1.71 | 12.28 | 26.09 |
| Acid number, mg KOH/g | 7.1 | 168.4 | 133.5 |
| Free (EPA + DHA) % | 0.5 | 4.3 | 15.5 |
| Dioxins, Furans and Dioxin like PCBs, TEQ ppt (lower bound) | 2.87 | 18.96 | 0.28 |
| PCB 209, ppb (lower bound) | 24.97 | 168.21 | 2.72 |
| Total PAHs, ppb | 27.3 | 231.2 | 3.4 |
| Pesticides, ppb | 8.1 | 77.3 | <LOQ |
| Inorganic As, ppm | 3.5 | <LOQ | <LOQ |
| Heavy metals, ppm | 0.02 | <LOQ | <LOQ |

[1]As mg of cholesteryl oleate/g of sample; LOQ: Limit of Quantification

As can be observed, a formulated pellet comprising at most 3% of residue R2, a product of process 1, is enough to meet the cholesterol requirement of shrimp and prawn, thereby eliminating the need to use lanolin derived cholesterol, and is also enough to meet the EPA and DHA requirements of said crustaceans without the need to include fish oil in the feed. In addition, given that the total fat or lipid content in the formulated pellet for shrimps and prawns is from 6 to 9%, there remains an ample choice for additional sources of lipids, such as vegetable oils, to satisfy the two-additional essential fatty acid requirement of the crustaceans, the linoleic acid (LA), and alpha-linolenic acid (ALA).

In R1, there was no increase in trans fatty acids and the sum of EPA and DHA was 3% higher than in the anchovy oil utilized; and toxic and/or harmful anthropogenic contaminants were below the regulatory limits for POPs in fish oils.

Example 3

Cholesterol, EPA and DHA Containing Ingredient for Shrimp and Prawn Feed from Sardine Oil.

250 kg of sardine oil with 2 kg of bleaching clay was heated at 70° C. and at a vacuum of 50 mbar in a stirred vessel for 30 minutes. After separating the clay by filtration, 245 kg of bleached sardine oil was obtained.

240 kg of bleached sardine oil was admixed with 10 kg of auxiliary fluid of the composition shown in Table 2 above, and the admixture was fed to a VK 83 short path distillation column and distilled at the temperature of 245° C. and the pressure of 0.008 mbar. The condenser temperature was set to 20° C. A distillate D1 in the amount of 21.3 kg together with a residual sardine oil R1 was obtained.

Next, 15 kg of distillate D1 was fed to a VK 83 short path distillation column at the temperature of 167° C. and the pressure of 0.004 mbar. The condenser temperature was set to 20° C. A residue R2 in the amount of 4.4 kg was obtained. Table 4 presents the analytical results for Example 3.

TABLE 4

Analytical results for Example 3

|  | Sardine oil | Distillate D1 | Residue R2 |
|---|---|---|---|
| Free cholesterol, mg/g | 7.5 | 82.5 | 224.1 |
| Total cholesterol, mg/g | 8.2 | 83.9 | 239.4 |
| Cholesteryl ester[1], mg/g | 1.2 | 2.4 | 25.7 |
| Non-saponifiable matter, % | 1.66 | 13.04 | 24.70 |
| Acid number, mg KOH/g | 7.3 | 171.0 | 148.6 |
| Free (EPA + DHA) % | 0.7 | 7.6 | 26.8 |
| Dioxins, Furans and Dioxin like PCBs, TEQ ppt (lower bound) | 3.61 | 17.08 | 0.21 |
| PCB 209, ppb (lower bound) | 17.45 | 247.49 | 1.87 |
| Total PAHs, ppb | 22.1 | 256.4 | 4.9 |
| Pesticides, ppb | 12.9 | 142.7 | <LOQ |
| Inorganic As, ppm | 5.2 | <LOQ | <LOQ |
| Heavy metals, ppm | 0.04 | <LOQ | <LOQ |

[1]As mg of cholesteryl oleate/g of sample; LOQ: Limit of Quantification

As can be observed, a formulated pellet comprising at most 3% of residue R2, a product of process 1, is enough to meet the cholesterol requirement of shrimp and prawn, thereby eliminating the need to use lanolin derived cholesterol, and is also enough to meet the EPA and DHA requirements of said crustaceans without the need to include fish oil in the feed. POPs levels are well below the international regulation limits for these contaminants and even lower than the starting sardine oil. More than 95% of the original non-saponifiable matter different from cholesterol is removed from the sardine oil.

In R1, there was no increase in trans fatty acids and the sum of EPA and DHA was 3% higher than in the sardine oil utilized; and toxic and/or harmful anthropogenic contaminants were below the regulatory limits for POPs in fish oils.

Example 4

Cholesteryl Esters from Mackerel Oil.

250 kg of mackerel oil was admixed with 15 kg of auxiliary fluid having the composition set forth in Table 2, and the mixture was fed to a VK 83 short path distillation column and distilled at the temperature of 241° C. and the pressure of 0.006 mbar. The condenser temperature was set to 20° C. A distillate D1 in the amount of 23.2 kg together with a residual mackerel oil R1 was obtained.

Next, 15 kg of distillate D1 was fed to a VK 83 short path distillation column at the temperature of 155° C. and the pressure of 0.004 mbar. The condenser temperature was set to 20° C. A residue R2 in the amount of 4.1 kg was obtained.

3 kg of residue R2 was heated at 160° C. and at a vacuum of 60 mbar in a stirred vessel for 12 hours yielding about 2.9 kg of esterified product.

Next, 2 kg of esterified product was fed to a VK 83 short path distillation column at the temperature of 252° C. and the pressure of 0.02 mbar. A distillation residue R3 in the amount of 1.4 kg was obtained. Table 5 presents the analytical results for Example 4.

TABLE 5

Analytical results for Example 4.

|  | Mackerel oil | Residue R3 |
|---|---|---|
| Free cholesterol, mg/g | 10.5 | 1.0 |
| Total cholesterol, mg/g | 11.4 | 503.2 |
| Cholesteryl ester[1], mg/g | 1.6 | 873.4 |
| Unsaponifiable matter, % | 1.42 | 51.05 |
| Acid number, mg KOH/g | 5.1 | 0.6 |
| (EPA + DHA) % | 0.4 (free) | 26.7 (total, mainly esterified) |
| Dioxins, Furans and Dioxin like PCBs, ppt (lower bound) | 3.09 | <LOQ |
| PCB 209, ppb (lower bound) | 16.04 | <LOQ |
| Total PAHs, ppb | 14.2 | <LOQ |
| Pesticides, ppb | 4.7 | <LOQ |
| Inorganic As, ppm | 5.7 | <LOQ |
| Heavy metals, ppm | 0.03 | <LOQ |

[1]As mg of cholesteryl eicosapentaenoate/g of sample; LOQ: Limit of Quantification As can be observed, a formulated pellet comprising at most 3% of residue R3, a product of process 2, is enough to meet the cholesterol requirement of shrimp and prawn, thereby eliminating the need to use lanolin derived cholesterol, and is also enough to meet the EPA and DHA requirements of said crustaceans without the need to include fish oil in the feed. In addition, given that the total fat or lipid content in the formulated pellet for shrimps and prawns is from 6 to 9%, there remains an ample choice for additional sources of lipids, such as vegetable oils, to satisfy the two-additional essential fatty acid requirement of the crustaceans, the linoleic acid (LA), and alpha-linolenic acid (ALA).

The concentration of dioxins, furans, PCB-like dioxins, PAHs and inorganic arsenic were under detection limit. The non-saponifiable matter content in the product different from cholesterol is less than 1%.

In R1, there was no increase in trans fatty acids and the sum of EPA and DHA was 2% higher than in the mackerel oil utilized; and toxic and/or harmful anthropogenic contaminants were below the regulatory limits for POPs in fish oils.

Example 5

Contaminant Analysis of Cholesteryl Ester from Anchovy Oil.

Anchovy oil was processed as in Example 4 to yield a R3 product with 51.7% of total cholesterol and 25.3% of EPA+DHA. The non-saponifiable matter content free of cholesterol in R3 was below 1%.

A comprehensive contaminant analysis shown in the following Table 6 was performed on the distillate D1, residue R3 and the anchovy oil.

TABLE 6

| | | Anchovy Oil | D1 | R3 |
|---|---|---|---|---|
| Dioxins and Furans (17 PCDD/F) | WHO(2005)-PCDD/F TEQ (lower-bound), pg/g | 0.114 | 1.09 | <LOQ |
| Polychlorinated biphenyls (12 WHO PCB) | WHO(2005)-PCB TEQ (lower-bound), pg/g | 1.87 | 7.87 | <LOQ |
| Polychlorinated biphenyls (6 ICES PCB) | Total 6 ndl-PCB (lower-bound), ng/g | 8.58 | 47.3 | <LOQ |
| TEQ-Totals WHO-PCDD/F and PCB | WHO(2005)-PCDD/F + PCB TEQ (lower-bound), pg/g | 1.98 | 8.96 | <LOQ |
| PCB 209, polychlorinated biphenyls 209 in total | Total Mono- to DecaCB (lower bound), ng/g | 31.2 | 177.9 | <LOQ |
| Polybrominated biphenyls ethers (24 PBDE) | sum of 24 BDEs (excl. LOQ), ng/g | 0.532 | 5.65 | <LOQ |
| Ester-bound 2-chloropropane-1,3-diol (2-MCPD ester) | Total 2-MCPD (free and bound), µg/kg | 220 | 1100 | <LOQ |
| Ester-bound 3-chloropropane-1,2-diol (3-MCPD ester) | Total 3-MCPD (free and bound), µg/kg | 160 | 4400 | <LOQ |
| Ester-bound 3-chloropropane-1,2-diol (3-MCPD ester) and glycidol (glycidyl ester) | Total 3-MCPD (free and bound), µg/kg | 460 | 7000 | <LOQ |
| Arsenic (As) | Arsenic (As), mg/kg | 8.3 | 0.7 | <LOQ |
| Benzo(a)pyrene | Benzo(a)pyrene, µg/kg | 0.7 | 6.3 | <LOQ |
| Organochlorine Pesticides and Pyrethroides | DDT (total), mg/kg | 0.01 | 0.077 | <LOQ |
| Organochlorine Pesticides and Pyrethroides | DDE, p,p'-, mg/kg | 0.01 | 0.069 | <LOQ |
| Methoxylated (MeO-) PBDEs | 2-MeO-PBDE-68, ng/g | 0.3 | 21.9 | <LOQ |
| Methoxylated (MeO-) PBDEs | 2-MeO-PBDE-47, ng/g | 0.2 | 22.6 | <LOQ |

LOQ: Limit of Quantification

2-MeO-PBDE-68 and 2-MeO-PBDE-47 are naturally occurring methoxilated PBDEs which accumulate in fish oil via the marine food web but may also originate by biotransformation of PBDEs.

Example 5 is further proof of the high efficacy of process 2 to produce a cholesterol composition from fish oil free from anthropogenic contaminants and also free from naturally occurring contaminants as well, and at the same time leading to a contaminant free fish oil of high quality suitable for animal or human consumption or for the elaboration of EPA and DHA concentrates.

The invention claimed is:

1. A process for producing a composition comprising cholesterol, eicosapentaenoic acid and docosahexaenoic acid, comprising the steps of:
    (a) distilling a fish oil in a vacuum distillation column to obtain a first residue and a first distillate, and
    (b) distilling the first distillate in a vacuum distillation column to obtain a second distillate and a second residue,
wherein the second residue is a composition having a lower content of anthropogenic contaminants than the fish oil and comprises at least 20 wt. % of cholesterol and at least 15 wt. % of polyunsaturated fatty acids, based on 100% total weight of the composition, and
wherein the polyunsaturated fatty acids comprise eicosapentaenoic acid and docosahexaenoic acid, wherein in step (a) the fish oil is distilled in an admixture with an auxiliary fluid.

2. The process according to claim 1, wherein the weight ratio of the auxiliary fluid to the fish oil in the admixture is about 1:100 to 10:100.

3. The process according to claim 1, wherein the vacuum distillation column is a short-path distillation column.

4. The process according to claim 1, wherein the fish oil is fed into the vacuum distillation column in step (a) at a rate of 1 to 150 kg/h per m² of evaporator area.

5. The process according to claim 1, wherein the admixture is fed into the vacuum distillation column at a rate of 1 to 150 kg/h per m² of evaporator area.

6. The process according to claim 1, wherein step (a) is conducted at an evaporation temperature of 150 to 300° C. and a column pressure of 0.0001 to 0.5 mbar.

7. The process according to claim 6, wherein step (a) is conducted at an evaporation temperature of 180 to 280° C. and a column pressure of 0.001 to 0.1 mbar.

8. The process according to claim 1, wherein the first distillate is fed to a vacuum distillation column in step (b) at a rate of 10 to 350 kg/h per m² of evaporator area.

9. The process according to claim 1, wherein step (b) is conducted at an evaporation temperature of 100 to 250° C. and a column pressure of 0.0001 to 0.5 mbar.

10. A process for producing a composition comprising cholesteryl esters of eicosapentaenoic acid and docosahexaenoic acid, comprising the steps of:
    a) distilling fish oil in a vacuum distillation column to obtain a first residue and a first distillate,
    b) distilling the first distillate in a vacuum distillation column to obtain a second distillate and a second residue comprising cholesterol, eicosapentaenoic acid and docosahexaenoic acid,
    c) esterifying the second residue to obtain a mixture comprising cholesteryl esters, and
    d) distilling the mixture comprising cholesterol esters in a vacuum distillation column to obtain a third distillate and a third residue,
wherein the third residue is a composition having a lower content of anthropogenic contaminants than the fish oil and comprises at least 50% by weight of cholesteryl esters, the cholesteryl esters comprising at least 20% by weight of cholesteryl esters of polyunsaturated fatty acids, based on 100% total weight of the composition, and
wherein the cholesteryl esters of polyunsaturated fatty acids comprise cholesteryl esters of eicosapentaenoic acid and cholesteryl esters of docosahexaenoic acid, wherein in step (a) the fish oil is distilled in an admixture with an auxiliary fluid.

11. The process according to claim 10, wherein the vacuum distillation column is a short-path distillation column.

12. The process according to claim 10, wherein the fish oil is fed into the vacuum distillation column in step (a) at a rate of 1 to 150 kg/h per m² of evaporator area.

13. The process according to claim 10, wherein the weight ratio of the auxiliary fluid to the fish oil in the admixture is about 1:100 to 10:100.

14. The process according to claim 10, wherein step (a) is conducted at an evaporation temperature of 150 to 300° C. and a column pressure of 0.0001 to 0.5 mbar.

15. The process according to claim 10, wherein the first distillate is fed into the vacuum distillation column in step (b) at a rate of 10 to 350 kg/h per m² of evaporator area.

16. The process according to claim 10, wherein the admixture is fed to the vacuum distillation column in step (a) at a rate of 1 to 150 kg/h per m² of evaporator area.

17. The process according to claim 10, wherein step (b) is conducted at an evaporation temperature of 100 to 250° C. and a column pressure of 0.0001 to 0.5 mbar.

18. The process according to claim 10, wherein the second residue in step (b) is fed to a closed vessel at a pressure of less than 250 mbar and heated at a temperature of 50 to 200° C. for a period of time between 1 to 72 hours to obtain an esterified mixture.

19. The process according to claim 18, wherein the esterified mixture is fed to the vacuum distillation column at a rate of 50 to 300 kg/h per m² of evaporator area.

20. The process according to claim 10, wherein step (d) is conducted at an evaporation temperature of 150 to 260° C. and a column pressure of 0.0001 mbar to 0.5 mbar.

21. A process for producing a composition comprising cholesterol, eicosapentaenoic acid and docosahexaenoic acid, comprising the steps of:
    (a) distilling a fish oil in an admixture with an auxiliary fluid in a vacuum distillation column to obtain a first residue and a first distillate, and
    (b) distilling the first distillate in a vacuum distillation column to obtain a second distillate and a second residue,
wherein
    (i) the second residue is a composition having a lower content of anthropogenic contaminants than the fish oil and comprises at least 20 wt. % of cholesterol and at least 15 wt. % of polyunsaturated fatty acids, based on 100% total weight of the composition,
    (ii) the polyunsaturated fatty acids comprise eicosapentaenoic acid and docosahexaenoic acid, and
    (iii) the auxiliary fluid is a fluid that distills at a temperature between about 150° C. and about 300° C. at a pressure of between about 0.0001 mbar and 5 mbar, and is miscible with cholesterol.

22. The process according to claim 21, wherein the auxiliary fluid comprises one or more ethyl esters of fatty acids.

23. The process according to claim 22, wherein the fatty acids are selected from myristic acid, palmitic acid, palmitoleic acid, stearic acid, oleic acid, linoleic acid, alpha-linolenic acid, and any combination thereof.

* * * * *